May 7, 1957   L. A. ROSENTHAL ET AL   2,791,747
COMPUTING VOLTMETER

Filed March 14, 1952   3 Sheets-Sheet 1

*INVENTORS*
LOUIS A. ROSENTHAL
AND
*BY* GEORGE M. BADOYANNIS

Leonard H. King
AGENT

May 7, 1957     L. A. ROSENTHAL ET AL     2,791,747

COMPUTING VOLTMETER

Filed March 14, 1952     3 Sheets-Sheet 3

*INVENTORS*
LOUIS A. ROSENTHAL
AND
BY    GEORGE M. BADOYANNIS

Leonard H. King
AGENT

United States Patent Office 2,791,747
Patented May 7, 1957

2,791,747
COMPUTING VOLTMETER

Louis A. Rosenthal and George M. Badoyannis, New Brunswick, N. J.; said Louis A. Rosenthal as trustee for Louis A. Rosenthal, George M. Badoyannis, and Leonard H. King Application March 14, 1952, Serial No. 276,508

11 Claims. (Cl. 324—123)

This invention relates to computing circuits and in particular a voltmeter utilizing such circuits.

In evaluating complex voltage and current waveforms it is most significant to compare in terms of root mean square (R. M. S.) values. Two voltage waveforms having equal R. M. S. values will produce the same heating effect in a purely resistive circuit. For a voltage of the general form $$v = V_0 f(t)$$

the R. M. S. value is defined as:

$$v_{rms} = \left(\frac{1}{T}\int_0^T \overline{V_0 f(t)}^2 \, dt\right)^{\frac{1}{2}}$$

While conventional types of instruments have been available for many years that will read true R. M. S. values up to frequencies of about 500 cycles, a need has long existed for devices that will operate more satisfactorily in the audio and radio frequency regions. Further, a requirement exists for a device which will not make excessive power demands on the circuit under test. The thermocouple type instrument has negligible frequency sensitivity and has been used at radio frequencies. However, it is available only as a low impedance ammeter requiring relatively large power inputs, exhibiting a sluggish response, and operating close to the burn-out level.

At audio frequencies, the conventional types of vacuum tube voltmeters are generally peak or average reading instruments. Although the scale may be calibrated to indicate the R. M. S. value of a sine wave, the reading is ambiguous for complex waveforms. An instrument which will indicate the R. M. S. value of a complex waveform at audio and radio frequencies with high sensitivity, will afford a valuable tool in the study of non-sinusoidal waveforms.

The device of this invention offers many solutions to the problems of R. M. S. instrumentation. For example, in distortion analysis, the R. M. S. value of all the harmonics can be measured directly after the fundamental has been suppressed. Complex waveforms can be measured comprehensively. Since the output current is already squared, the meter indication can be interpreted as power in constant resistance circuits. Recorders can be connected to the output and a power level recording can readily be obtained. Form factors of complex waves can be determined as the ratio of the R. M. S. to average value as determined by conventional vacuum tube voltmeter circuits.

As a voltage squarer this invention is extremely useful for low cost frequency doublers and simple computers.

The instrument is simple to operate as a voltmeter since conventional D.-C. balancing of the meter is not necessary.

The invention has particular merit in not requiring expensive and cumbersome filters used in prior art devices to eliminate the fundamental frequency.

Accordingly, it is an object of this invention to provide a device to measure the R. M. S. value of a voltage signal.

It is still a different object of this invention to provide a simple frequency multiplying circuit.

A further object of this invention is to provide an R. M. S. vacuum tube voltmeter which does not require preliminary balancing of D.-C. voltage.

A particular object of this invention is to provide a voltmeter capable of measuring complex voltage waveforms at audio and radio frequencies.

Another object of this invention is to provide a voltmeter of the recording type for complex voltages.

Still other objects, advantages and features of the invention are those implied or inherent in the novel combination and arrangement of the electronic circuits employed as will become more fully apparent from the following description, with reference to the accompanying drawings in which, Figure 1 shows schematically a simple embodiment of this invention.

Figure 2 shows graphically the operation of this invention with respect to a typical current-voltage characteristic of a non-linear element having a resistance which varies inversely with voltage.

Figure 3 presents diagrammatically a preferred circuit of this invention.

Figure 1:
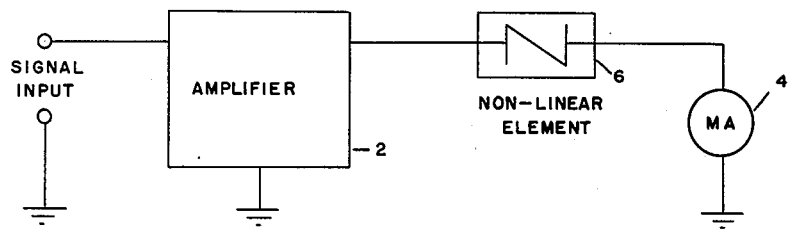

In the simple embodiment of this invention shown in Figure 1, a signal to be measured is amplified by amplifier 2 and fed to the ammeter 4 through a non-linear current limiting resistor 6. By choosing such a non-linear element having a coefficient $n=2$ in the following equation:

$$|i| = k|v|^n$$

the current through the meter will vary as the square of the instantaneous voltage applied to the non-linear element. The resistance of the meter is made negligible with respect to that of the non-linear element and thus for all practical purposes the effect of the meter resistance may be disregarded. For a linear meter, the meter reading is directly proportional to volts squared, and by suitably marking the scale, the square root of the mean square may be read directly.

It follows accordingly that "$n$" can be made to equal 4 or 6 or any other power of particular significance.

In what we presently believe to be the best embodiment of this invention we prefer to employ "Thyrite" as the non-linear element. "Thyrite" is the trademark of the General Electric Company for a ceramic composition material consisting chiefly of silicon carbide formed into a non-ohmic resistor. It has an extreme voltage coefficient which results in an instantaneous volt-ampere characteristic which is symmetrical about the origin and follows:

$$|i| = k|v|^n$$

where "$n$" generally varies between 1.5 and 7. The non-linear elements which have the lower resistance range are generally the least non-linear or have the lower exponents. Non-linearity can be reduced within limits by shunting the element with a resistor or putting a resistor in series. The shunt circuit is preferred since the composite resistance decreases thereby increasing the overall sensitivity. Starting with "Thyrite" having an exponent slightly greater than 2, it is possible to shunt and linearize it, so that the overall exponent is made closely $2(n=2)$, for a single quadrant, thus permitting the use of a linear indicating meter. Plotting current vs. voltage squared for different shunts will indicate the transition to a square law characteristic, for purposes of shunt selection. Experience indicates that the accuracy of squaring can be within ±2.5%, for a current range of 50 to 1, within the power dissipation ratings, of the non-linear elements. For a given range to be optimumly squared the shunt resistance depends on the current level, or nominal resistance level, and the non-linear element's exponent "$n$".

This level is kept constant for a wide range of input signals by providing a suitable attenuator or a variable gain control for the amplifier which supplies current to the non-linear element.

Figure 2:
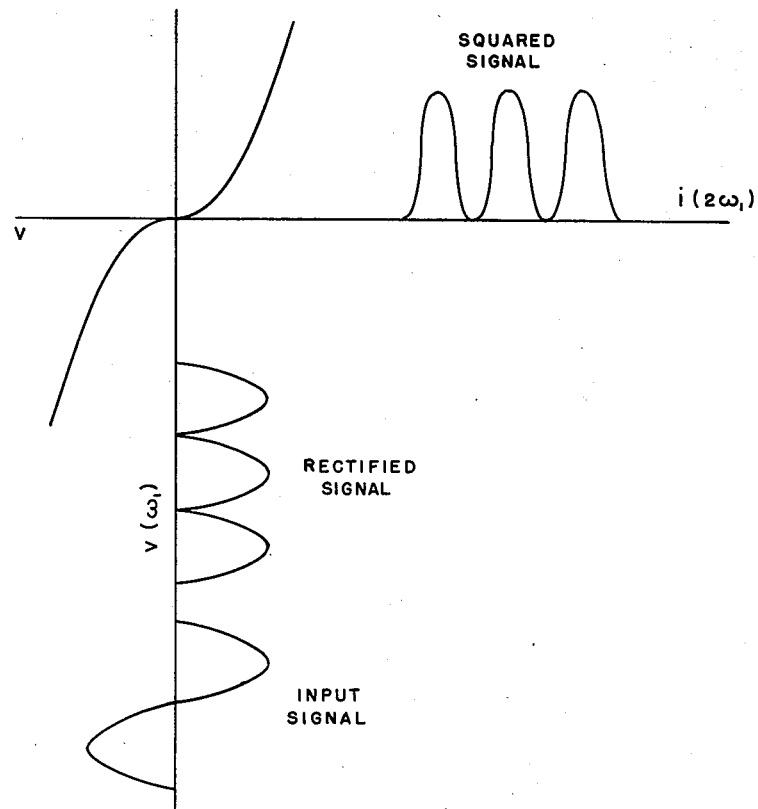

Although the combination of the silicon carbide and shunt linear resistor has an exponent of 2 in a single quadrant, the unit is bilateral and has zero-point symmetry. The zero-point symmetry must be converted to zero-axis symmetry for true squaring action. By interposing a full wave bridge rectifier, before the non-linear element, automatic switching is obtained which produces the required zero-axis symmetry. This action is shown graphically in Figure 2. Thus the non-linear element operates in only one quadrant, which results in the electrical equivalent of a true square law characteristic. The instantaneous volt-ampere characteristic or transfer characteristic can then be treated as:

$$i = kv^2$$

Figure 3:
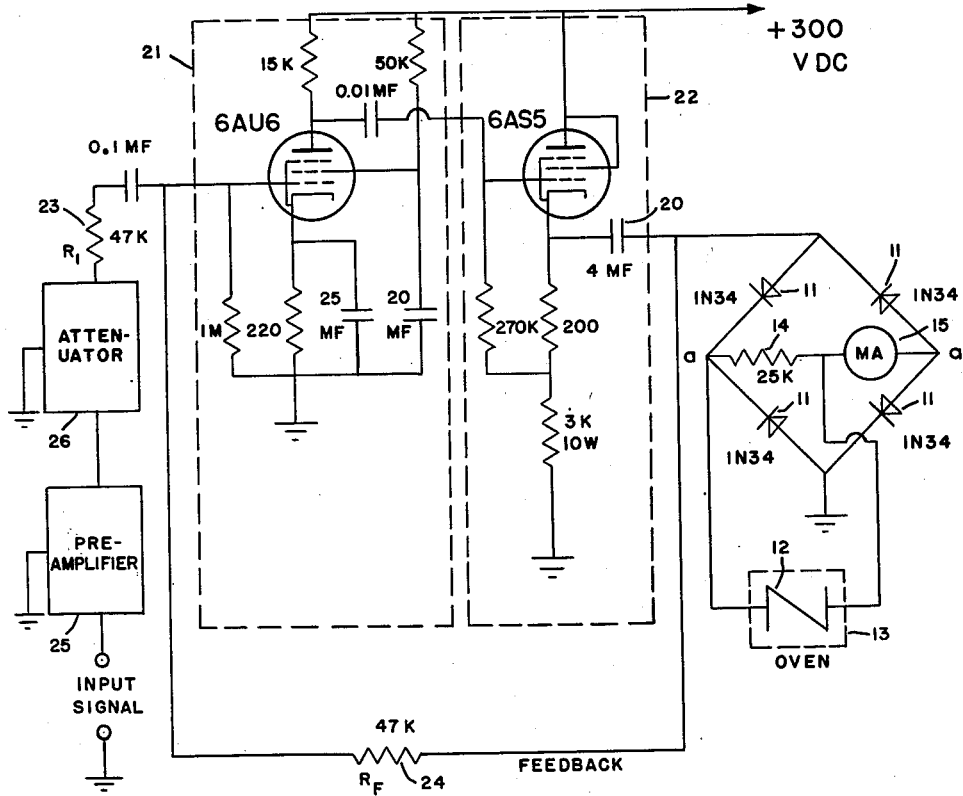

The circuit is shown in Figure 3 wherein type IN34 germanium diodes are arranged in a full wave bridge circuit. Silicon carbide non-linear element 12 is located inside a constant temperature oven 13 such as is used for piezo-electric crystals. Linear resistor 14 is connected in parallel with the non-linear element 12 and in series with a meter 15 across the bridge circuit. The bridge circuit is driven by a special cathode follower circuit 22 described later in detail.

It is preferred that germanium diodes be used as the rectifier elements as they do not significantly disturb the "squared" characteristic. For example, the lowest nominal silicon carbide type element impedance, in the range used, is about 5 kilohms and the forward resistance of type IN34 germanium crystal diodes is approximately 100 ohms. The non-linearity of the rectifier in the zero current region is of small importance since the true square law characteristic should have infinite resistance at the origin.

A rapid method for choosing the proper shunt resistor, to insure squaring action, and for checking the overall performance of the squaring circuit, requires the use of a distortion analyzer such as the Hewlett-Packard Model 320A Distortion Analyzer. A small value resistor, fifty ohms being sufficient, is placed in series with the squaring circuit. The voltage developed across the resistor being passed into the distortion analyzer. For true squaring action, an input sinusoidal voltage of the form $$v = V_0 \sin wt$$

will result in a current $$i = \frac{kV_0^2}{2} - k\frac{V_0^2}{2} \cos 2w$$

The magnitude of the second harmonic voltage across the resistor (R) when divided by R will give the current flowing (both peak A. C. and D. C. components of current are equal). This current should correspond to the sensitivity of the output meter. The A. C. signal applied can be, as an example, 200 C. P. S. and the distortion in the 400 C. P. S. output can be measured. The recommended procedure is to try resistors of various values in parallel with the non-linear element and measure the distortion until one is found which results in sufficiently low distortion. Experience has shown that such a shunt is readily obtainable.

The D. C. milliammeter in the output of the "squarer" will indicate the mean square current irrespective of the waveform. A 0 to 1 milliampere meter is convenient for use with General Electric silicon carbide elements catalog No. 8396839GRI; approximately 5 volts R. M. S. being necessary to give full scale deflection. The input impedance of the composite "squarer" is bilateral and non-linear, and varies approximately inversely with the amplitude of the applied voltage. It is important that the driving impedance be small so that the voltage applied to the "squarer" is identical to the input signal.

Special precautions are necessary in the design of the driver circuit for the non-linear squaring circuit. Since the impedance of the circuit varies inversely with the instantaneous voltage, applied signals having high peak to R. M. S. ratios (crest factor) can result in instantaneous impedances as low as 700 ohms. An extremely low internal impedance is required of the driver so as to preserve the complex voltage waveform. The ordinary cathode follower is not adequate and the coupling condenser for D. C. isolation adds to the driver impedance. An electrolytic condenser should not be used for coupling because of its high leakage current. The use of a 4 mfd. metallized paper capacitor as the isolating capacitor 20 is made practical by utilizing feedback from a following point.

The driver stage has a pentode voltage amplifier, shown within dotted block 21, driving a cathode follower stage shown within dotted block 22. With series Resistor ($R_1$) 23, and Feedback Resistor ($R_f$) 24 the overall gain ($A_f$) can be shown to be $$A_f = -\frac{R_f}{R_1} \cdot \frac{A\beta}{1+A\beta}$$

where A is the gain without feedback and $$\beta = \frac{R_1}{R_f + R_1}$$

For the case of equal resistors, the gain is $$A_f = \frac{-A}{2+A}$$

and the internal impedance is reduced by a factor $A/2$. Feedback masks the effects of variations in A and results in a good frequency characteristic and a low output impedance. The midband value of A is 50 for the circuit shown. Suitable values for the other components used in one embodiment of this invention are shown in Figure 3.

It requires in the neighborhood of 5 volts at the input of the driver to pass an average current of 1 ma. in the output meter. A preamplifier 25 and attenuator 26 are necessary to increase the overall sensitivity and provide all the aspects of a conventional voltmeter. Details will not be discussed here, since amplifier and attenuator techniques are well established. If the full advantage is to be taken of the frequency response of the driver the preamplifier must be equally good. It must be stabilized against tube aging and supply potential variations. Since the detector's output is in terms of mean square values, a 1% change in gain will result in a 2% change in meter deflection. The attenuator should be of a low impedance variety, fed through a cathode follower for high input impedance.

Complex waves can have high crest factors. Pulses, for example, can have large amplitudes and small R. M. S. values. Since most amplifiers have an overloading level, a compromise must be reached compatible with the waveforms to be studied. By passing sufficient current through the cathode follower and by proper design of the preamplifier, crest factors of 7 can be accommodated. As much as 25 ma. can pass instantaneously, or continuously, through the 1 ma. meter and, providing the pointer is brought up to the full scale stop slowly, the meter can absorb such overloads. Damping of 0.5 second can be built into the meter or a large capacitance can be placed across the movement to achieve proper results. The output meter should have a linear power scale and a square root calibration for readings to be most versatile.

The ultimate high frequency range is limited by the high shunt capacity of the silicon carbide or other non-linear element. Since the dielectric constant of the silicon carbide type material used is about 100, high frequencies are adversely affected and the "squarer" circuit no longer accurately functions. Therefore, complex waves having high frequency components greater than approximately 500,000 C. P. S. will be measured with error. Fortunately, the higher frequency terms generally contribute little to the total R. M. S. value. It is obvious that the D. C. component of the injected signal is lost in passing through the voltmeter. This D. C. component if present, is generally easily measured by other means. Many waveforms lose their D. C. components in the generating electronic circuits.

The temperature sensitivity of the non-linear elements can introduce an error. The temperature coefficient of resistivity of "Thyrite" type elements is about —0.5%/°C. Mounting the element in a hot spot on the chassis will cause an amount of warm-up drift, but final readings will be relatively independent of ambient temperature variations. A better approach is to mount the element in a temperature controlled oven such as those used for frequency controlling quartz crystals. These ovens are small in size, convenient to install, and readily available.

Although the meter can be calibrated with sine wave signal inputs, it is of greater meaning to check the calibration with complex waveforms. A 0–50 ma. thermocouple type R. F. milliammeter can be used to measure the R. M. S. value of a complex current passing through a 10 ohm resistor. The voltage drop across the 10 ohm resistor can then be passed on to the voltmeter through the preamplifier and the reading should correspond to the R. M. S. input voltage squared. The R. F. milliammeter can be compared to an accurate D. C. millammeter for initial calibration.

Tests were made on apparatus substantially as described showed that the sum of two voltages of different frequency and amplitude checked excellently with the thermocouple readings. Waveforms with excessive third harmonic (i. e. exciting current in a transformer) were measured correctly. A half-rectified sinusoid checked satisfactorily, after the D. C. component was removed. Triangular and rectangular pulses also gave a correct meter indication. The response to complex waveforms was very satisfactory.

Figure 4:
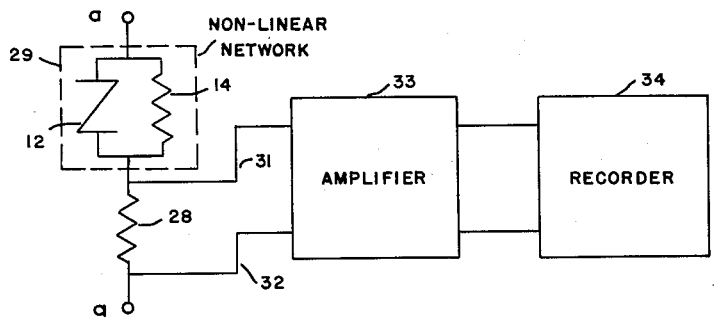
Figure 4 is a circuit diagram of an alternate metering circuit suitable for automatic recording.

An alternate metering circuit for power level recording is disclosed in Figure 4 which may be connected to points a—a of the bridge circuit. In lieu of meter 15 of Figure 3, the voltage developed across a resistor 28 of low ohmic value, by current passing through the non-linear network 29 is fed through leads 31 and 32 to an amplifier 33 to a meter 34 which may be a recording type instrument.

Figure 5:
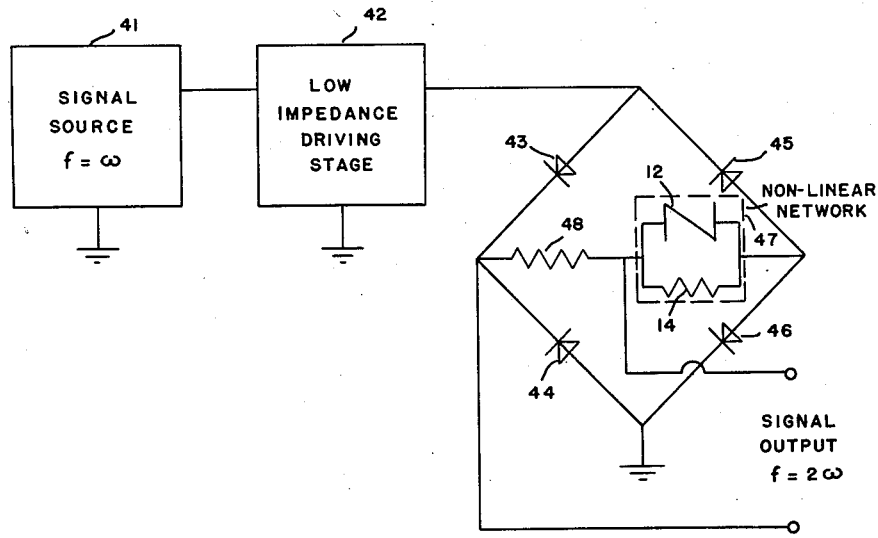
Figure 5 shows partially in schematic and partially diagrammatically a frequency doubler of this invention.

The invention may be used as a frequency multiplier by utilizing the circuit shown in Figure 5 wherein a source 41 of a signal $f=w$ is fed to a low impedance driving stage 42 which may be the previously discussed cathode follower circuit and then to the full wave rectifier bridge circuit formed of rectifiers 43, 44, 45 and 46. A signal of frequency $2w$ is present in the current passing through the non-linear network 47 which has a "squared" characteristic for applied voltages. This current develops a voltage across resistor 48 which may be fed to conventional metering devices.

It is to be understood that the above described arrangements are simply illustrative of the application of the principles of the invention and that numerous other arrangements may be readily devised by those skilled in the art which will embody the princples of the invention and fall within the spirit and scope thereof.

We claim:

1. A device for measuring electrical signal potentials comprising a means to apply said potentials to a low impedance driver circuit, a full wave bridge rectifier having a pair of opposed input terminals and a pair of opposed output terminals, means electrically connecting said low impedance driver circuit to the said opposed bridge input terminals, and a bilateral non-linear resistance in series with a current measuring means connected to the said opposed bridge output terminals; said non-linear resistance being characterized by a power variation of resistance with variation of applied voltage.

2. The device of claim 1 having an ohmic compensating resistance in parallel with said non-linear resistance element.

3. The device of claim 1 wherein said current measuring means comprises an ohmic resistance element in series with said non-linear resistance element, means to amplify the signal voltage developed across said ohmic resistance element, and means to record said amplified signal.

4. A device for measuring electrical potentials comprising in cascade connection, means to amplify said potentials, means to attenuate said potentials, and a cathode follower circuit arranged to apply said electrical potentials to a full wave bridge rectifier and means to apply the output of said bridge to a bilateral non-linear resistive element, the resistance of which varies exponentially, to a fixed power, with respect to voltage, in series with a current measuring device.

5. The device of claim 4 having an ohmic resistor in parallel with said non-linear resistive element.

6. A device for measuring electrical potentials comprising a full wave bridge rectifier circuit having a pair of opposed input terminals and a pair of opposed output terminals, means to apply said electrical potentials to the said opposed input terminals of said bridge, and a bilateral non-linear element in series with a current measuring means connected to the said opposed output terminals of said bridge; said non-linear element being characterized by a power variation of resistance with variation of the applied potentials.

7. The device of claim 6 having an ohmic resistor in parallel with said non-linear resistive element.

8. The device of claim 6 wherein said non-linear resistance is maintained at essentially constant temperature.

9. A circuit for measuring alternating current potentials, said circuit comprising a full wave bridge rectifier having a pair of opposed input terminals and a pair of opposed output terminals means to connect a source of pulsating current across the said pair of opposed bridge input terminals for measuring said potential and a bilateral non-linear element in series with a current measuring device connected to said opposed output terminals; said non-linear element being characterized by a current-voltage relationship conforming to:

$$i = kv^n$$

wherein "$n$" is a number other than 1.

10. A device for measuring electrical potentials comprising a circuit arranged for amplifying said electrical potentials, a full wave bridge rectifier circuit having a pair of opposed input terminals and a pair of opposed output terminals, a cathode follower circuit connecting said amplifying circuit and said opposed input terminals, a bilateral non-linear resistance element and a current measuring means in series connection with said opposed output terminals, said non-linear resistance element being characterized by a power variation of resistance with applied voltage, a capacitor interposed between the cathode connection of said cathode follower circuit and one of said pair of opposed input terminals and a voltage feedback circuit arranged between said one of said pair of terminals and the input of said amplifier.

11. In a device for measuring the R. M. S. value of an electrical signal, a resistance coupled amplifier cascade coupled to a cathode follower circuit, a full wave bridge rectifier of the type utilizing germanium diodes and having a pair of opposed input terminals and a pair of opposed output terminals, a capacitor coupling said cathode follower circuit to one of said pair of opposed input terminals, a voltage feedback circuit connecting said one of said pair of opposed input terminals with the input to said amplifier, a network consisting of a silicon carbide resistance and an ohmic resistance in parallel, said network having a resistance characteristic that varies exponentially with change in voltage in accordance with the equation $$i = kv^2$$

a current measuring means arranged to measure variation in current through said network, and means connecting said network and said pair of opposed output terminals.

References Cited in the file of this patent

UNITED STATES PATENTS

| | | |
|---|---|---|
| 2,119,194 | Bäbler | May 31, 1938 |
| 2,199,190 | Shore | Apr. 30, 1940 |
| 2,498,900 | Schoenfeld | Feb. 28, 1950 |
| 2,523,240 | Vackar | Sept. 19, 1950 |

FOREIGN PATENTS

| | | |
|---|---|---|
| 337,907 | Great Britain | Nov. 13, 1930 |
| 715,208 | Germany | Sept. 26, 1934 |

OTHER REFERENCES

Thyrite, a G-E Resistance Material. Published by General Electric. Received by U. S. Patent Office April 4, 1950.

Vacuum Tube Voltmeters, by John F. Rider. John F. Rider Publisher, Inc., New York. Published October 1945. (In Div. 69.)